United States Patent Office 2,995,556
Patented Aug. 8, 1961

2,995,556
DESERPIDIC ACID ESTERS
Robert Armistead Lucas, Mendham, N.J., assignor to Ciba Pharmaceutical Products, Inc., Summit, N.J., a corporation of New Jersey
No Drawing. Filed Jan. 19, 1959, Ser. No. 787,340
15 Claims. (Cl. 260—287)

The present invention concerns substituted lower alkyl esters. More particularly, it is directed to esters of the formula:

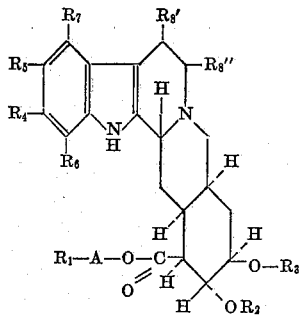

in which $R_1$ represents lower alkoxy or tertiary amino, A stands for a lower alkylene radical separating the group $R_1$ from the carboxy group by at least two carbon atoms, $R_2$ represents lower alkyl, $R_3$ represents an acyl radical of an organic carboxylic acid, $R_4$ stands for hydrogen, lower alkyl, hydroxyl, lower alkoxy, monocyclic carbocyclic aryl-lower alkoxy, lower alkyl-mercapto or halogen, each of the substituents $R_5$, $R_6$ and $R_7$ represents primarily hydrogen, or one of the substituents characteristic of $R_4$, whereby $R_5$ may also form together with $R_4$ a lower alkylenedioxy radical, and each of the radicals $R_8'$ and $R_8''$ represents primarily hydrogen, or lower alkyl, and salts of these compounds, as well as process for the preparation thereof.

The lower alkylene radical A, containing from two to seven carbon atoms, separates the radical $R_1$, i.e. the lower alkoxy or tertiary amino group, by at least two carbon atoms from the carboxy group. Primarily anticipated is the 1,2-ethylene radical; other lower alkylene groups are, for example, 1-methyl-1,2-ethylene, 2-methyl-1,2-ethylene or 1,3-propylene.

$R_1$, when standing for lower alkoxy, represents, for example, methoxy, ethoxy, propyloxy or isopropyloxy. A tertiary amino group is primarily an N,N-di-lower alkyl-amino group, e.g. dimethylamino, diethylamino or dipropylamino; other tertiary amino groups are pyrrolidino groups, e.g. pyrrolidino, piperidino groups, e.g. piperidino or 3-methyl-piperidino, hexamethyleneimino groups, e.g. hexamethyleneimino, morpholino groups, e.g. morpholino, or piperazino groups, e.g. 4-methyl-piperazino.

The lower alkyl radical $R_2$ may stand for ethyl, propyl, isopropyl, but represents primarily methyl.

The acyl group $R_3$ is represented by the acyl radical of an organic carboxylic acid. A variety of such acids may furnish such a radical, for example, lower aliphatic carboxylic acids, aromatic carbocyclic aryl carboxylic acids, aromatic carbocyclic aryl-lower aliphatic carboxylic acids, heterocyclic aryl carboxylic acids or heterocyclic aryl-lower aliphatic carboxylic acids.

Lower aliphatic carboxylic acids may be lower alkanoic acids, lower cycloalkanoic acids, lower cycloalkyl-lower alkanoic acids, lower alkenoic acids, lower cycloalkenoic acids or lower cycloalkenyl-lower alkenoic acids, which may contain additional substituents. Examples of such acids are acetic, propionic, butyric, isobutyric, trimethyl-acetic, hexahydrobenzoic, cyclopentyl-propionic, acrylic, methyl-acrylic, crotonic, isocrotonic, angelic, tiglic or tetrolic acid, or substituted lower aliphatic acids, e.g. ethoxy-carbonic, pyruvic, methoxyacetic, phenoxyacetic, dimethylaminoacetic, acetoacetic, shikimic, prephenic or amino carboxylic acids. Aliphatic carboxylic acids are also dicarboxylic acids, such as, for example, malonic, succinic, glutaric, glutamic, malic, fumaric, maleic, tartaric or citric acid.

Primarily anticipated as acyl radicals of organic carboxylic acids are those of aromatic carbocyclic aryl carboxylic acids; benzoic acid and benzoic acids substituted by lower alkyl, hydroxyl, lower alkoxy, lower alkylenedioxy, lower alkanoyloxy, lower alkoxy-carbonyloxy, nitro, amino, halogen, lower alkyl-mercapto, etc., are the preferred group. Such acids are, for example, lower alkyl substituted benzoic acids, e.g. m-toluic, p-toluic acid or 3,4,5-trimethyl-benzoic acid; hydroxyl substituted benzoic acids, e.g. 4-hydroxy-benzoic, 3,4-dihydroxy-benzoic or 2,5-dihydroxy-benzoic acid; lower alkoxy substituted, such as methoxy or ethoxy substituted, benzoic acids, e.g. 4-methoxy-benzoic, 3,4-dimethoxy-benzoic, 3,4,5-trimethoxy-benzoic, 4-ethoxy-benzoic, 3,4,5-triethoxy-benzoic, vanillic or syringaic acid; lower alkylenedioxy substituted benzoic acids, e.g. piperonylic acid; lower alkanoyloxy-benzoic acids, e.g. 4-acetoxy-benzoic acid; lower alkoxy-carbonyloxy-benzoic acids, such as O-lower alkoxy-carbonyl-vanillic or O-lower alkoxy-carbonyl-syringaic acids, e.g. O-ethoxycarbonyl-vanillic, O-methoxycarbonyl-syringaic or O-ethoxycarbonyl-syringaic acid; nitro substituted benzoic acids, e.g. 4-nitro-benzoic; 3-nitro-benzoic or 5-nitro-vanillic acid; amino substituted benzoic acids, e.g. 3-amino-benzoic or 4-amino-benzoic acid; di-lower alkyl-amino-benzoic acid, e.g. 3-dimethylamino-benzoic or 4-dimethylamino-benzoic acid; halogen substituted benzoic acids, e.g. 4-chloro-benzoic or 3,4-dichloro-benzoic acid; lower alkyl-mercapto substituted benzoic acids, e.g. 4-methyl-mercapto-benzoic acid; or other similar benzoic acids. Aromatic monocyclic carbocyclic aryl dicarboxylic acids are, for example, phthalic, isophthalic or terephthalic acid.

Aromatic bicyclic carbocyclic aryl carboxylic acids are 1-naphthoic or 2-naphthoic acids or substituted naphthoic acids, such as, for example, 1-methoxy-2-naphthoic or 1-ethoxycarbonyloxy-2-naphthoic acid.

Aromatic carbocyclic aryl-lower aliphatic carboxylic acids are primarily lower alkanoic or lower alkenoic acids substituted by monocyclic carbocyclic aryl radicals. Examples of such acids are phenyl-acetic acid, 4-methoxy-phenyl-acetic acid, 3,4,5-trimethoxy-phenyl-acetic acid, diphenylacetic acid, 2-methoxy-2-phenyl-acetic acid, 2-ethoxycarbonyloxy-2-phenyl-acetic acid, 3-phenyl-propionic acid, 3-(3,4,5-trimethoxy-phenyl)-propionic acid, cinnamic acid, 4-methoxy-cinnamic acid, 3,4,5-trimethoxy-cinnamic acid, ferulic acid or O-ethoxycarbonyl-ferulic acid.

Heterocyclic aryl carboxylic acids are particularly monocyclic heterocyclic aryl carboxylic acids, which contain nitrogen, sulfur or oxygen as ring members. Such acids are, for example, nicotinic acid, isonicotinic acid, 2-thienoic or 2-furoic acid, which may contain additional substituents such as, for example, lower alkyl. Bicyclic heterocyclic aryl carboxylic acids are, for example, quinolyl carboxylic acids, e.g. 6-quinolyl-carboxylic acid.

Heterocyclic aryl-lower aliphatic carboxylic acids are primarily monocyclic heterocyclic aryl-lower alkanoic acids, e.g. 3-pyridyl-acetic, 4-pyridyl-acetic or 2-thienyl-acetic acid.

The substituent $R_4$ represents primarily hydrogen or lower alkoxy, e.g. ethoxy, propyloxy or isopropyloxy, or especially methoxy. It may also stand for hydroxyl; monocyclic carbocyclic aryl-lower alkoxy, e.g. benzyloxy; lower alkyl mercapto, e.g. ethylmercapto; lower alkyl, e.g. methyl; or halogen, e.g. fluorine, chlorine or bromine.

The substituents $R_5$, $R_6$ and $R_7$ represent primarily hydrogen; they may also stand for the substituents characteristic for $R_4$, such as, for example, lower alkyl, e.g. methyl; hydroxyl; lower alkoxy, e.g. methoxy; or halogen, e.g. chlorine. Furthermore, $R_5$ may form together with $R_4$ a lower alkylenedioxy, e.g. methylenedioxy, radical.

Each of the radicals $R_8'$ and $R_8''$ stands preferably for hydrogen; if it represents lower alkyl, such radical may be ethyl, or primarily methyl.

Salts of the new diesters of this invention are pharmaceutically acceptable addition salts with acids, primarily inorganic acids, such as mineral acids, e.g. hydrochloric, hydrobromic, sulfuric or phosphoric acid; or strong organic acids, e.g. acetic, hydroxy-acetic, methane sulfonic acid or similar acids.

The new esters of this invention have antihypertensive and tranquilizing properties, whereby the sedative component is more pronounced than the antihypertensive effect, when compared with the antihypertensive: tranquilizing ratio of known Rauwolfia alkaloids, such as reserpine, deserpidine or rescinnamine. Furthermore, the onset of the pharmacological effect is much faster with the compounds of this invention than with the above-mentioned alkaloids; a fast onset of a tranquilizing action is of particular importance in the treatment of acute conditions or emergency cases. The compounds of the present invention can, therefore, be used as antihypertensive and, primarily as sedative agents having a fast onset of activity, particularly in the treatment of acute mental disturbances. The pharmacological effects are particularly pronounced in 2-lower alkoxy-ethyl O—$R_3$-11-$R_4$-deserpidates, in which $R_3$ stands for a benzoyl group substituted by lower alkoxy, e.g. methoxy, lower alkylenedioxy, e.g. methylenedioxy, lower alkoxy-carbonyloxy, e.g. ethoxycarbonyloxy, or di-lower alkyl-amino, e.g. dimethyl-amino; or for a cinnamoyl group, the carbocyclic ring of which is substituted by lower alkoxy, e.g. methoxy, or lower alkoxy-carbonyloxy, e.g. ethoxycarbonyloxy, and $R_4$ represents hydrogen or methoxy. Representing this group of compounds are esters of 2-methoxyethyl reserpate with 3,4-dimethoxybenzoic acid, 3,4,5-trimethoxybenzoic acid, piperonylic acid, O-ethoxycarbonyl-syringaic acid, 3-dimethylamino-benzoic acid, 3,4,5-trimethoxy-cinnamic acid or O-ethoxycarbonyl-ferulic acid, or esters of 2-methoxyethyl deserpidate with 3,4-dimethoxybenzoic acid, 3,4,5-trimethoxybenzoic acid, piperonylic acid, O-ethoxycarbonyl-syringaic acid, 3-dimethylamino-benzoic acid, 3,4,5-trimethoxycinnamic acid or O-ethoxycarbonyl-ferulic acid.

Other esters are those of lower alkoxy-lower alkyl 10-methoxy-deserpidates, lower alkoxy-lower alkyl 10,11-dimethoxy-deserpidates, lower alkoxy-lower alkyl 10,11-methylenedioxy-deserpidates, lower alkoxy-lower alkyl 11-methyl-deserpidates, lower alkoxy-lower alkyl 11-ethylmercapto-deserpidates or lower alkoxy-lower alkyl 10-chloro-deserpidates, in which lower alkyl separates lower alkoxy from the carboxy group by at least two carbon atoms, with the previously mentioned carboxylic acids, particularly the substituted benzoic or substituted cinnamic acids.

Similar effects can be obtained with 2-di-lower alkyl-aminoethyl O—$R_3$-11-$R_4$-deserpidates, in which $R_3$ stands for a benzoyl group substituted by lower alkoxy, e.g. methoxy, loweralkylenedioxy, e.g. methylenedioxy, lower alkoxy-carbonyloxy, e.g. ethoxy-carbonyloxy, or di-lower alkyl-amino, e.g. dimethylamino; or for a cinnamoyl group, the aromatic ring of which is substituted by lower alkoxy, e.g. methoxy, or lower alkoxycarbonyloxy, e.g. ethoxycarbonyloxy, and $R_4$ represents hydrogen or methoxy. Representing this group of compounds are esters of 2-dimethylaminoethyl reserpate with 3,4-dimethoxybenzoic acid, 3,4,5-trimethoxybenzoic acid, piperonylic acid, O-ethoxycarbonyl-syringaic acid, 3-dimethylamino-benzoic acid, 3,4,5-trimethoxy-cinnamic acid or O-ethoxycarbonyl-ferulic acid, or esters of 2-dimethylaminoethyl deserpidate with 3,4-dimethoxybenzoic acid, 3,4,5-trimethoxybenzoic acid, piperonylic acid, O-ethoxycarbonyl-syringaic acid, 3-dimethylamino-benzoic acid, 3,4,5-trimethoxy-cinnamic acid or O-ethoxycarbonyl-ferulic acid.

Other esters are those of di-lower alkyl-amino-lower alkyl 10-methoxy-deserpidates, di-lower alkyl-amino-lower alkyl 10,11-dimethoxy-deserpidates, di-lower alkyl-amino-lower alkyl 10,11-methylenedioxy-deserpidates, di-lower alkyl-amino-lower alkyl 11-methyl-deserpidates, di-lower alkyl-amino-lower alkyl 11-ethylmercapto-deserpidates or di-lower alkyl-amino-lower alkyl 10-chloro-deserpidates, in which lower alkyl separates the di-lower alkyl-amino group from the carboxy group by at least two carbon atoms, with the previously mentioned carboxylic acids, particularly the substituted benzoic or substituted cinnamic acids.

The compounds of this invention may be used as medicaments in the form of pharmaceutical preparations, which contain the new esters or the salts thereof in admixture with a pharmaceutical organic or inorganic, solid or liquid carrier suitable for enteral, e.g. oral, or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known carrier for medicaments. The pharmaceutical preparation may be in solid form, for example, as capsules, tablets or dragees, or in liquid form, for example, as solutions, suspensions or emulsions. If desired, they may contain auxiliary substances such as preserving agents, stabilizing agents, wetting or emulsifying agents, salts for varying the osmotic pressure or buffers. They may also contain, in combination, other therapeutically useful substances.

The new esters of the present invention are prepared according to known esterification procedures. For example, monoesters of the following formula:

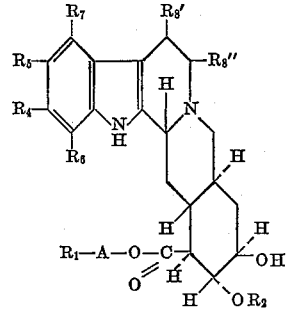

in which $R_1$, $R_2$, $R_4$, $R_5$, $R_6$, $R_7$, $R_8'$, $R_8''$ and A have the above-given meaning, may be reacted with a reactive functional derivative of a carboxylic acid of the formula $R_3$—OH, in which $R_3$ has the above-given meaning, or a salt thereof, and, if desired, a resulting salt may be converted into the free base, and/or, if desired, a free base may be converted into a salt thereof.

Reactive functional derivatives of carboxylic acids of the formula $R_3$—OH are primarily the carboxylic acid halides, particularly the carboxylic acid chlorides, or the carboxylic acid anhydrides. If the functional derivative of the carboxylic acid contains a salt forming group as a substituent, for example, an amino group, it may be used in the form of an acid addition salt, particularly with an inorganic acid, such as a mineral acid, e.g. hydrochloric acid. These esterifying derivatives are reacted with the compounds to be esterified under anhydrous conditions and, if necessary, in the presence of a reagent capable of neutralizing any generated acid. Such reagents are, for example, organic tertiary bases, particularly heterocyclic tertiary bases, e.g. pyridine, picoline, collidine or lutidine, or aliphatic tertiary amines, e.g. trimethylamine, N,N-dimethyl-N-ethyl-amine, N,N-diethyl-N-methyl-amine or triethylamine. Other suitable reagents are, for example, alkali metal or alkaline earth metal carbonates, e.g. sodium, potassium or calcium carbonate or hydrogen carbonate. The liquid organic bases or the liquid esterifying reagents, for example, acetic acid anhydride, may simultaneously serve as solvents; other solvents are, for example, aromatic hydrocarbons, e.g. benzene, toluene or xylene, or aliphatic hydrocarbons, e.g. pentane or hexane. The reaction may be carried out under cooling, at room temperature, or, if necessary, at an elevated temperature, and, if desired, in the atmosphere of an inert gas, e.g. nitrogen and/or with the exclusion of moisture.

The starting materials used in the above reaction, having the following formula:

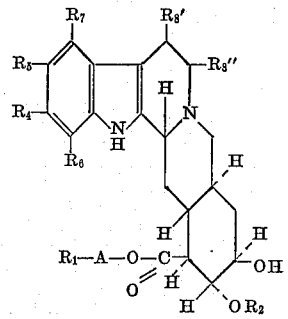

in which $R_1$ stands for lower alkoxy or tertiary amino, A for lower alkylene, separating the radical $R_1$ from the carboxy group by at least two carbon atoms, $R_2$ for lower alkyl, $R_4$ for hydrogen, lower alkyl, hydroxyl, lower alkoxy, monocyclic carbocyclic aryl-lower alkoxy, lower alkylmercapto or halogen, each of the substituents $R_5$, $R_6$ and $R_7$ represents primarily hydrogen, or the substituents characteristic of $R_4$, whereby $R_5$ may also form together with $R_4$ a lower alkylenedioxy radical, and each of the radicals $R_8'$ and $R_8''$ represents primarily hydrogen, or lower alkyl, and salts thereof are new and are intended to be included within the scope of the present invention. Particularly anticipated are those monoesters, which are used in the preparation of diesters having outstanding pharmacological effects; these are 2-lower alkoxy-ethyl 11-$R_4$-deserpidates or 2-di-lower alkyl-amino-ethyl 11-$R_4$-deserpidataes, in which $R_4$ represents hydrogen or methoxy.

These monoesters may be prepared according to standard esterification procedures. Thus, they may be obtained by esterifying acids of the formula:

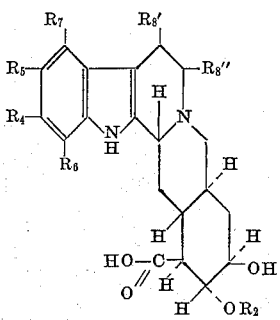

in which $R_2$, $R_4$, $R_5$, $R_6$, $R_7$, $R_8'$ and $R_8''$ have the previously-given meaning, with a diazo-compound of the formula $R_1$—A—$N_2$, in which $R_1$ stands for lower alkoxy or tertiary amino, and A represents a lower alkylene radical separating the radical $R_1$ from the diazo group by at least two carbon atoms, and, if desired, a resulting salt is converted into the free base, and/or, if desired, a free base is converted into a salt thereof.

The esterification reaction is carried out analogous to other similar procedures. For example, a solution of the diazo compound in an inert solvent, particularly in diethylether, is used; the free acid is added to the diazo compound in solution, for example, in a lower alkanol, e.g. methanol or ethanol. An excess of the diazo compound present after the completed addition of the acid can be destroyed, for example, by addition of an additional carboxylic acid, e.g. acetic or benzoic acid.

The starting material may also be prepared by alcoholysis of lactones of the formula:

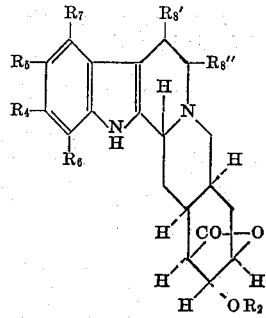

in which $R_2$, $R_4$, $R_5$, $R_6$, $R_7$, $R_8'$ and $R_8''$ have the previously-given meaning, with the alkali metal compound of an alcohol of the formula $R_1$—A—OH, in which $R_1$ stands for lower alkoxy or tertiary amino, A a lower alkylene radical, separating the group $R_1$ from the carboxy group by at least two carbon atoms, and, if desired, carrying out the optional steps.

This reaction is performed according to known standards, for example, by reacting the necessary amount of an alkali metal, e.g. lithium, potassium, or particularly sodium, with an alcohol of the formula $R_1$—A—OH, or a solution thereof, and adding the lactone to the resulting alkali metal compound of the alcohol of the formula $R_1$—A—OH or a solution thereof. Although the reaction may proceed under the cooling or room temperature, the mixture is advantageously heated, if necessary, in the atmosphere of an inert gas, e.g. nitrogen.

Thus, the 2-lower alkoxy-ethyl 11-$R_4$-deserpidates and the 2-di-lower alkyl-amino-ethyl 11-$R_4$-deserpidates, in which $R_4$ represents hydrogen or methoxy, may be prepared by esterifying 11-$R_4$-deserpidic acid, in which $R_4$ has the aforementioned meaning, with a 2-lower alkoxy-diazoethane or a 2-di-lower alkyl-amino-diazoethane, respectively. Or, an 11-$R_4$-deserpidic acid lactone, in which $R_4$ represents hydrogen or methoxy, may be alcoholized with an alkali metal, e.g. sodium, compound of a 2-lower alkoxy-ethanol or a 2-di-lower alkyl-amino-ethanol, respectively.

The resulting esters are isolated according to standard methods, such as extraction, crystallization, adsorption and elution, etc. and purified by recrystallization, if desired, with the aid of adsorbents.

The free acids or the lactones thereof, used in the preparation of the starting material of the process of the invention are known, or, if unknown, may be prepared according to the known procedures. The starting materials may be used as mixtures of racemates, racemates or antipodes; products, when isolated in the form of mixtures of racemates or as racemates, may be separated into racemates and antipodes respectively, according to standard methods.

Depending on the conditions used, the compounds of this invention are obtained in the form of the free bases or the salts thereof. A salt may be converted into the free base, for example, by reaction with aqueous silver oxide or with ammonia. A free base may be converted into its therapeutically useful acid addition salts by reaction with one of the inorganic or organic acids outlined hereinbefore, for example, by treating a solution of the base in a lower alkanol, e.g. methanol, ethanol, propanol or isopropanol with the acid or a solution thereof. The salts may also be obtained as the hemihydrates, monohydrates, sesquihydrates or polyhydrates depending on the conditions used in the formation of the salts; mono- or polysalts may be formed depending on the number of salt-forming groups present and/or the conditions of the salt formation.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

Example 1

A mixture of 5 g. of 2-methoxy-methyl reserpate, 3.2 g. of 3,4,5-trimethoxy-benzoyl chloride and 50 ml. of dry pyridine is allowed to stand at room temperature for 17 hours and then poured into water. The gummy material is triturated with additional quantities of water, filtered off, washed with water and dissolved in methylene chloride. The organic solution is filtered through Florex (diatomaceous earth) and evaporated. The crystalline residue is recrystallized from ethyl acetate to yield the 2-methoxyethyl O - (3,4,5-trimethoxybenzoyl)-reserpate, M.P. 130–134°.

The starting material may be prepared as follows: To a mixture of 226 g. of a 33% aqueous solution of 2-methoxy-ethylamine and 150 ml. of diethyl ether, kept at 5° to 10° in an ice bath, is added dropwise 54 g. of ethyl chloroformate. Then, 100 g. of a cold solution of 40% aqueous sodium hydroxide and a second portion of 54 g. of ethyl chloroformate are given to the mixture, which is stirred for one hour. The ether layer is separated, the aqueous phase is extracted with 100 ml. of diethyl ether, and the two ether solutions are combined and dried over potassium carbonate. The solvent is evaporated under reduced pressure and the ethyl N-(2-methoxyethyl)-carbamate is distilled at 105–106°/17–20 mm.

To a solution of 33 g. of ethyl (2-methoxyethyl)-carbamate in 200 ml. of diethyl ether is added 25 g. of cracked ice and a solution of 81 g. of sodium nitrite in 125 ml. of water. While keeping the temperature below 15°, 150 g. of 35% aqueous nitric acid is added carefully over a period of one hour. The ether layer is separated, washed with water and aqueous potassium carbonate and dried over potassium carbonate. The residue, obtained after evaporation of the solvent under reduced pressure, represents the ethyl N-(2-methoxyethyl)-N-nitroso-carbamate, which is used without further purification.

A gently refluxing solution of 5 g. of potassium hydroxide in 15 g. of methanol and 150 ml. of diethyl ether is treated with a solution of 15.5 g. of ethyl N-(2-methoxyethyl)-N-nitroso-carbamate in 50 ml. of diethylether, which is added dropwise over a period of one hour. After refluxing for 5 minutes 100 ml. of water is added and the yellow ether solution, containing the 2-methoxy-diazoethane, is separated.

The above ether solution of 2-methoxy-diazoethane is reacted with small portions of a slurry of reserpic acid in methanol until no further reaction could be observed. A few drops of acetic acid are added, the solution is evaporated under reduced pressure and the residual oil is dissolved in ethyl acetate. Upon addition of petroleum ether a precipitate is formed, which is filtered off, dissolved in methylene chloride, which solution is washed with aqueous ammonia and filtered through a small Florisil (diatomaceous earth) column. The residue, obtained after evaporation of the solvent is crystallized from ethyl acetate to yield the 2-methoxyethyl reserpate, M.P. 183–185°.

Instead of using 3,4,5-trimethoxy-benzoyl chloride as the esterifying reagent, other organic carboxylic acid halides, particularly chlorides can be utilizes to esterify the 2-methoxy-ethyl reserpate, for example, lower aliphatic carboxylic acid chlorides, e.g. butyryl chloride, trimethyl-acetyl chloride, hexahydrobenzoyl chloride, crotonyl chloride or angelic acid chloride; aromatic carbocyclic aryl carboxylic acid chlorides, e.g. benzoyl chloride, 3,4,5-trimethylbenzoyl chloride, 4-methoxy-benzoyl chloride, 3,4-dimethoxy-benzoyl chloride, 3,4,5-triethoxy-benzoyl chloride, piperonyl chloride, O-methoxycarbonyl-syringoyl chloride, 3-nitrobenzoyl chloride, 4-nitrobenzoyl chloride, 4-dimethylamino-benzoyl chloride, 3,4-dichloro-benzoyl chloride, 1-naphthoyl chloride or 1-ethoxycarbonyloxy-2-naphthoyl chloride; aromatic carbocyclic aryl-lower aliphatic carboxylic acid chlorides, e.g. phenylacetyl chloride, diphenylacetyl chloride, 3,4,5-trimethoxyphenyl-acetyl chloride, 2 - ethoxycarbonyloxy-2-phenylacetyl chloride, 3-(3,4,5-trimethoxy - phenyl) - propionyl chloride, cinnamoyl chloride, 3,4,5-trimethoxy-cinnamoyl chloride or O-ethoxy-carbonyl-ferulyl chloride; heterocyclic carboxylic acid chlorides, e.g. nicotinoyl chloride, isonicotinoyl chloride, thienoyl chloride or furoyl chloride; or heterocyclic-lower aliphatic carboxylic acid chlorides, e.g. 3-pyridyl-acetyl chloride, 4-pyridyl-acetyl chloride or 2-thienyl-acetyl chloride. The esterifying reaction is generally carried out according to the above-described procedure as illustrated in the example.

In place of the carboxylic acid halides, the corresponding anhydrides are suitable in the esterification procedure; particularly useful are lower aliphatic carboxylic acid anhydrides, e.g. acetic acid anhydride or propionic acid anhydride.

Example 2

A mixture of 4 g. of 2-methoxy-ethyl reserpate and 3.0 g. of O-ethoxycarbonyl-syringoyl chloride in 50 ml. of dry pyridine is allowed to stand at room temperature for 17 hours and is then poured into water. The reaction mixture is worked up as shown in Example 1; the 2-methoxyethyl O-(O-ethoxy-carbonyl-syringoyl) - reserpate is recrystallized from a mixture of ethyl acetate and petroleum ether, M.P. 214–216°.

The starting material may be prepared as follows: To a solution of 0.08 g. of sodium in 125 ml. of 2-methoxy-ethanol is added 10 g. of reserpic acid lactone and the mixture is treated at 100° for 17 hours. After acidification with aqueous hydrochloric acid (1:1) the solution is concentrated under reduced pressure to about one third of its original volume and an equal volume of water is added. The mixture is made basic with aqueous ammonia, extracted with methylene chloride, which extract is evaporated under reduced pressure. Unreacted reserpic acid lactone is removed by crystallization from methanol; the crystallization mother liquors are concentrated and diluted with ethyl acetate to yield 2-methoxy-ethyl reserpate, M.P. 185–187°.

Instead of reserpic acid lactone, deserpidic acid lactone may be treated with sodium 2-methoxy-ethanolate according to the previously-given procedure; the resulting 2-methoxyethyl deserpidate may then be esterified according to the procedure exemplified in the two examples by using one of the previously mentioned esterifying reagents, such as, for example, acetic acid anhydride, 3,4-dimethoxy-benzoyl chloride, 3,4,5 - trimethoxy - benzoyl chloride, O-ethoxycarbonyl-syringoyl chloride, 3-dimethyl-amino-benzoyl chloride, 3,4,5-cinnamoyl chloride, O-ethoxycarbonyl-ferulyl chloride, nicotinoyl chloride or isonicotinoyl chloride.

Other deserpidic acids or deserpidic acid lactones which are suitable in the preparation of the corresponding 2-methoxy-ethyl esters, are the 11-methyl-deserpidic acid lactone, 10-methoxy-deserpidic acid lactone, 11-ethoxy-deserpidic acid lactone, 10,11-methylenedioxy-deserpidic acid lactone, 5-methyl-reserpic acid lactone, 17-desmethoxy-17-ethoxy-reserpic acid lactone, 17-desmethoxy-17-isopropyloxy-reserpic acid lactone, 17-desmethoxy-17-n-propyloxy-reserpic acid lactone, 10-benzyloxy-deserpidic acid lactone, 11-benzyloxy-deserpidic acid lactone, 9-methyl-deserpidic acid lactone, 11-methylmercapto-deserpidic acid lactone, 11-propyloxy-deserpidic acid lactone, 11-isopropyloxy-deserpidic acid lactone, 9-methoxy-deserpidic acid lactone, 11-n-butyloxy-deserpidic acid lactone, 11-ethylmercapto-deserpidic acid lactone or 10,11- dimethoxy-deserpidic acid lactone. The corresponding free acids may also be used; they can be obtained by direct hydrolysis of the lactones, for example, with an alkali metal hydroxide, e.g. sodium or potassium hydroxide, in an aqueous lower alkanol, e.g. methanol or ethanol, or indirectly, by converting the lactone into the monoester, for example, by treatment with an alkali metal lower alkanolate, e.g. sodium methanolate, and then hydrolyzing the monoester with an alkali metal hydroxide in an aqueous lower alkanol.

The acids and the corresponding lactones are esterified according to either one of the two procedures given in the examples, with 2-methoxy-diazoethane and with an alkali metal, e.g. sodium, 2-methoxy-ethanolate, respectively. The 2-methoxy-diazoethane and the alkali metal 2-methoxy-ethanolate may be replaced by other lower alkoxy-lower diazoethanes, e.g. 2-ethoxy-diazoethane or 2-isopropyloxy-diazoethane, or other alkali metal lower alkoxy-lower alkanolates, e.g. sodium or potassium 2-ethoxy-ethanolate or 2-isopropyloxy-ethanolate to produce other lower alkoxy-lower alkyl esters of reserpic acid or deserpidic acid or analogs thereof, such as, for example, 2-ethoxy-ethyl deserpidate, 2-propyloxy-ethyl reserpate, 2-ethoxy - ethyl 11-methyl - deserpidate, 2-ethoxy-ethyl 10,11-methylenedioxy-deserpidate, 2-ethoxy-ethyl-17-desmethoxy-17-ethoxy-reserpate or 2-isopropyloxy-ethyl 5-methyl-reserpate.

*Example 3*

To 30 ml. of dry pyridine are added 2.37 g. of 2-dimethylamioethyl reserpate and 1.38 g. of 3,4,5-trimethoxybenzoyl chloride; the mixture is cooled with tap water and stirred for five minutes and then allowed to stand at room temperature overnight. The solution is poured into 300 ml. of cold water containing 10 ml. of ammonium hydroxide. The resulting precipitate is filtered off, washed with water and air dried. A methylene chloride solution is filtered through a short Florisil (diatomaceous earth) column, the solvent is evaporated and the residue recrystallized from a mixture of ethyl acetate and petroleum ether to yield 2-dimethylamino-ethyl O-(3,4,5-trimethoxybenzoyl)-reserpate, M.P. 158–165°; yield: 1.5 g.

The starting materials may be prepared as follows: A mixture of 88 g. of a 33% aqueous N,N-dimethyl-ethylenediamine and 150 ml. of ether is cooled to 5° and a total of 108.5 g. of ethyl chloroformate is added in portions. A solution of 40 g. of sodium hydroxide in 60 ml. of water is given to the reaction mixture simultaneously with the second half of the ethyl chloroformate; stirring is continued for an additional hour. The ether layer is separated, the aqueous portion is extracted with ether and the ether extracts are combined and dried over anhydrous potassium carbonate. The ether is evaporated, the residue is distilled, B.P. 118–122° at 17–20 mm., to yield the ethyl N-(2-dimethylaminoethyl)-carbamate.

A solution of 40 g. of ethyl N-(2-dimethylaminoethyl)-carbamate in 125 ml. of methylene chloride is cooled to 0°, and 19.5 g. of nitrosyl chloride in 300 ml. of methylene chloride is added over a period of approximately one hour while stirring and keeping the temperature between 0° to 5°. Stirring is continued for an additional two hours, the precipitate is filtered off and recrystallized from ethyl acetate to yield ethyl N-(2-dimethylaminoethyl)-N-nitroso-carbamate hydrochloride, M.P. 133–135°.

A suspension of 11.3 g. of ethyl N-(2-dimethylaminoethyl)-N-nitroso-carbamate hydrochloride in 100 ml. of ether is added to a mixture of 40 g. of a 25% methanol solution of potassium hydroxide and 300 ml. of ether while gently refluxing. After fifteen minutes of additional heating the ether layer, containing the 2-dimethylamino-diazoethane, is decanted and immediately used.

To the above ether solution is added portionwise 12.0 g. of reserpic acid in methylene chloride and methanol. The mixture is allowed to stand overnight at room temperature, the solvents are evaporated under reduced pressure, and the residue is added to 400 ml. of water containing 20 ml. of ammonium hydroxide. The water solution is extracted with methylene chloride, the organic solution is filtered through a Florisil (diatomaceous earth column) and evaporated. The 2-dimethylaminoethyl reserpate is recrystallized from a mixture of ethyl acetate and petroleum ether, M.P. 110–114°.

Instead of using 2-dimethylamino-diazoethane the corresponding 2-diethylamino-diazoethane, 2-piperidino-(N)-diazoethane or 2-morpholino-(N)-diazoethane may be used to esterify reserpic acid; other deserpidic acids, which may be esterified with the 2-dimethylamino-diazoethane or the above-mentioned diazo compounds are, for example, deserpidic acid, 11-methyl-deserpidic acid, 10-methoxy-deserpidic acid, 11-ethoxy-deserpidic acid, 10,11-methylenedioxy-deserpidic acid, 5 - methyl-reserpic acid, 17-desmethoxy-17-ethoxy-reserpic acid, 17-desmethoxy-17-isopropyloxy-reserpic acid, 17-desmethoxy-17-n-propyloxy-reserpic acid, 10-benzyloxy-deserpidic acid, 11-benzyloxy-deserpidic acid, 9-methyl-deserpidic acid, 11-methyl-mercapto-deserpidic acid, 11-propyloxy-deserpidic acid, 11-isopropyloxy-deserpidic acid, 9-methoxy-deserpidic acid, 11-n-butyloxy-deserpidic acid, 11-ethylmercapto-deserpidic acid or 10,11-dimethoxy-deserpidic acid.

The thus obtained monoesters may be esterified with 3,4,5-trimethoxy-benzoyl chloride, or, together with the 2-dimethylaminoethyl reserpate, with other carboxylic acid halides, such as lower aliphatic carboxylic acid chlorides, e.g. butyryl chloride, trimethyl-acetyl chloride, hexahydrobenzoyl chloride, crotonyl chloride or angelic acid chloride; aromatic carbocyclic aryl carboxylic acid chlorides, e.g. benzoyl chloride, 3,4,5-trimethylbenzoyl chloride, 4-methoxy-benzoyl chloride, 3,4-dimethyloxy-benzoyl chloride, 3,4,5-triethoxy-benzoyl chloride, piperonyl chloride, O-methoxycarbonyl-syringoyl chloride, O-ethoxy-carbonyl-syringoyl chloride, 3 - nitrobenzoyl chloride, 4-nitro-benzoyl chloride, 3-dimethylamino-benzoyl chloride, 4-dimethylamino-benzoyl chloride, 3,4-dichloro-benzoyl chloride, 1-naphthoyl chloride or 1-ethoxycarbonyloxy-2-naphthoyl chloride; aromatic carbocyclic aryl-lower aliphatic carboxylic acid chlorides, e.g. phenyl-acetyl chloride, diphenyl-acetyl chloride, 3,4,5-trimethoxy-phenyl-acetyl chloride, 2 - ethoxycarbonyloxy-2-phenyl-acetyl chloride, 3-(3,4,5-trimethoxyphenyl)-propionyl chloride, cinnamoyl chloride, 3,4,5-trimethoxy-cinnamoyl chloride, or O-ethoxy-carbonyl-ferulyl chloride; heterocyclic carboxylic acid chlorides, e.g. nicotinoyl chloride, isonicotinoyl chloride, thienoyl chloride or furoyl chloride; or heterocyclic-lower aliphatic carboxylic acid chlorides, e.g. 3-pyridyl-acetyl chloride, 4-pyridyl-acetyl chloride or 2-thienyl-acetyl chloride. The esterifying reaction is generally carried out according to the above-described procedure as illustrated in the example.

In place of the carboxylic acid halides, the corresponding anhydrides are suitable in the esterification procedure; particularly useful are lower aliphatic carboxylic acid anhydrides, e.g. acetic acid anhydride or propionic acid anhydride.

*Example 4*

A mixture of 4.0 g. of 2-methoxyethyl reserpate and 2.08 g. of 3-dimethylaminobenzoyl chloride hydrochloride in 50 ml. of pyridine is stirred for five minutes while cooling under tap water, and is then allowed to stand overnight at room temperature. After pouring it into 400 ml. of ice water containing 20 ml. of ammonium hydroxide, a solid material can be separated by filtration, which is dissolved in methylene chloride, and the solution it filtered through diatomaceous earth. The 2-methoxyethyl O-(3-dimethylamino-benzoyl)-reserpate remaining after evaporation of the solvent is recrystallized from a mixture of ethyl acetate and petroleum ether, M.P. 130–135°.

By using 2-methoxyethyl deserpidate as the starting material, the corresponding 2-methoxyethyl O-(3-dimethylamino-benzoyl)-deserpidate can be obtained.

Substituents in the final product may be converted into other substituents; for example, a lower alkoxy-carbonyloxy group may be hydrolyzed into a free hydroxyl group upon treatment with aqueous ammonia, and a nitro group may be reduced into an amino group by treatment with hydrogen in the presence of a catalyst e.g. palladium on charcoal, or into a dimethylamino group, if the hydrogenation is carried out in the presence of formaldehyde.

What is claimed is:

1. A member of the group consisting of compounds of the formula:

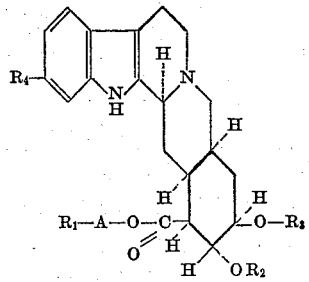

in which $R_1$ represents a member of the group consisting of lower alkoxy and di-lower alkyl amino, A stands for a lower alkylene radical separating the group $R_1$ from the carboxy group by at least two carbon atoms, $R_2$ represents lower alkyl, $R_3$ the acyl radical of an organic carboxylic acid selected from the group consisting of benzoic acid substituted by lower alkoxy, lower alkylenedioxy, lower alkoxy-carbonyloxy and di-lower alkyl-amino, and cinnamic acid substituted by lower alkoxy and lower alkoxy-carbonyloxy, $R_4$ stands for a member of the group consisting of hydrogen and lower alkoxy, and pharmaceutically acceptable acid addition salts thereof.

2. 2-lower alkoxyethyl O—$R_3$-reserpate, in which $R_3$ represents the acyl radical of benzoic acid substituted by lower alkoxy.

3. 2-methoxylethyl O-(3,4,5-trimethoxy-benzoyl)-reserpate.

4. 2-methoxyethyl O-(O-ethoxycarbonyl-syringoyl)-reserpate.

5. 2-methoxyethyl O-(3-dimethylamino-benzoyl)-reserpate.

6. 2-methoxyethyl O-(3,4,5-trimethoxybenzoyl)-deserpidate.

7. 2-methoxyethyl O-(3-dimethylamino-benzoyl)-deserpidate.

8. 2-di-lower alkyl-amino-ethyl O—$R_3$-reserpate, in which $R_3$ represents the acyl radical of benzoic acid substituted by lower alkoxy.

9. 2-dimethylaminoethyl O-(3,4,5-trimethoxybenzoyl)-reserpate.

10. A member of the group consisting of compounds of the formula:

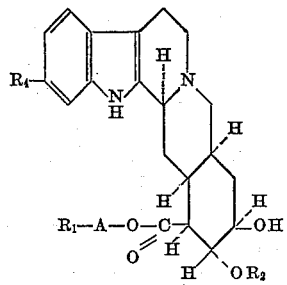

in which $R_1$ represents a member of the group consisting of lower alkoxy and di-lower alkyl-amino, A stands for a lower alkylene radical separating the group $R_1$ from the carboxy group by at least two carbon atoms, $R_2$ represents lower alkyl, $R_4$ stands for a member of the group consisting of hydrogen and lower alkoxy, and acid addition salts thereof.

11. 2-lower alkoxy-ethyl reserpate.
12. 2-methoxyethyl reserpate.
13. 2-methoxyethyl deserpidate.
14. 2-di-lower alkyl-amino-ethyl reserpate.
15. 2-dimethylaminoethyl reserpate.

References Cited in the file of this patent

UNITED STATES PATENTS

| | | |
|---|---|---|
| 2,786,843 | Huebner | Mar. 26, 1957 |
| 2,813,871 | Lucas | Nov. 19, 1957 |
| 2,824,874 | Schlittler | Feb. 25, 1958 |
| 2,867,622 | Lucas | Jan. 6, 1959 |
| 2,883,386 | Szmuszkovicz et al. | Apr. 21, 1959 |

OTHER REFERENCES

Ferguson: The Journal—Lancet, pp. 389–390, December 1956.

UNITED STATES PATENT OFFICE
CERTIFICATE OF CORRECTION

Patent No. 2,995,556                      August 8, 1961

Robert Armistead Lucas

It is hereby certified that error appears in the above numbered patent requiring correction and that the said Letters Patent should read as corrected below.

Colum 11, lines 22 to 33, and column 12, lines 14 to 25, for that portion of the formula, each occurrence, reading

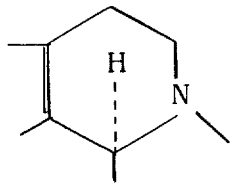　　read　　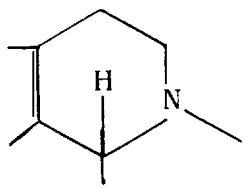

Signed and sealed this 9th day of April 1963.

(SEAL)
Attest:

ESTON G. JOHNSON　　　　　　　　　　　　DAVID L. LADD
Attesting Officer　　　　　　　　　　　　Commissioner of Patents